United States Patent
Giraudet et al.

(10) Patent No.: US 12,521,007 B2
(45) Date of Patent: Jan. 13, 2026

(54) METHODS FOR DETERMINING AN OPHTHALMIC LENS AND ASSOCIATED OPTOMETRY DEVICE

(71) Applicant: ESSILOR INTERNATIONAL, Charenton-le-Pont (FR)

(72) Inventors: Guillaume Giraudet, Orleans (FR); Marius Peloux, Palaiseau (FR); Philippe Pinault, Nogent sur Marne (FR); Stéphane Boutinon, Paris (FR)

(73) Assignee: Essilor International, Charenton-le-Pont (FR)

( * ) Notice: Subject to any disclaimer, the term of this patent is extended or adjusted under 35 U.S.C. 154(b) by 408 days.

(21) Appl. No.: 18/062,666

(22) Filed: Dec. 7, 2022

(65) Prior Publication Data
US 2023/0190093 A1    Jun. 22, 2023

(30) Foreign Application Priority Data
Dec. 16, 2021   (EP) .................................. 21306807

(51) Int. Cl.
  *A61B 3/09*     (2006.01)
  *A61B 3/00*     (2006.01)
  *A61B 3/103*    (2006.01)

(52) U.S. Cl.
  CPC .............. *A61B 3/09* (2013.01); *A61B 3/0025* (2013.01); *A61B 3/0091* (2013.01); *A61B 3/103* (2013.01)

(58) Field of Classification Search
  CPC ....... A61B 3/09; A61B 3/0025; A61B 3/0091; A61B 3/103; A61B 3/04; G02C 7/028; G02C 7/027
  USPC .......................................................... 351/240
  See application file for complete search history.

(56) References Cited

U.S. PATENT DOCUMENTS

| | | | | |
|---|---|---|---|---|
| 2010/0290003 A1* | 11/2010 | Dubois | ................... | G06F 30/20 |
| | | | | 351/159.76 |
| 2011/0184830 A1* | 7/2011 | Guilloux | ................ | G02C 7/065 |
| | | | | 703/2 |
| 2013/0057825 A1* | 3/2013 | Kato | ..................... | G02C 13/003 |
| | | | | 351/159.42 |
| 2015/0124214 A1* | 5/2015 | Contet | ................... | G02C 7/061 |
| | | | | 351/204 |

(Continued)

OTHER PUBLICATIONS

European Search Report Issued Jun. 3, 2022 in European Application 21306807.5 Filed on Dec. 16, 2021, 11 pages.

(Continued)

*Primary Examiner* — Mohammed A Hasan
(74) *Attorney, Agent, or Firm* — Oblon, McClelland, Maier & Neustadt, L.L.P.

(57) ABSTRACT

A method for determining an ophthalmic lens intended to be worn by an individual is provided. The ophthalmic lens is adapted to provide to the individual a vision correction at, at least one, given vision gaze direction. The vision correction is based on wearer data including prescription data of the individual. The method includes the steps of: determining a parameter pertaining to the accommodative dynamics of an eye of the individual, and determining the ophthalmic lens based on the wearer data and on the parameter pertaining to the accommodative dynamics of an eye of the individual. A device is provided for determining the parameter pertaining to the accommodative dynamics of an eye of an individual in the method.

15 Claims, 3 Drawing Sheets

(56) References Cited

U.S. PATENT DOCUMENTS

2017/0090204 A1    3/2017  Lebrun et al.
2017/0192250 A1*  7/2017  Rousseau ............... G02C 7/027
2018/0263488 A1*  9/2018  Pamplona ............ A61B 3/0041

OTHER PUBLICATIONS

Essilor Academy, "Progressive Lenses Fitting Guide", Essential Rules for the Successful Fitting of Progressive Lenses to Your Presbyopic Patients, XP055924535, 2020, URL: https://web.archive.org/web/20201230141711/http://www.essiloracademy.eu/pdf_server.php?file=/sites/default/files/Guide_ENGLISH.pdf, 40 pages.

* cited by examiner

METHODS FOR DETERMINING AN OPHTHALMIC LENS AND ASSOCIATED OPTOMETRY DEVICE

TECHNICAL FIELD OF THE INVENTION

The invention relates to the fields of optometry and of the determination of ophthalmic lenses suitable for switching from far to near vision and vice versa.

More precisely, the invention relates to a method for determining an ophthalmic lens intended to be worn in front of an eye of an individual.

The invention relates also to an optometry device for determining parameters used in the method above.

BACKGROUND INFORMATION AND PRIOR ART

The recent development of digital products such as smartphones or tablets in our daily life generates a higher engagement of our visual and attentional systems. Commercial ophthalmic lenses already exist, which help wearers better manage this intensive near vision demand by means of a boost part in the lower half of the lens. This boost part aims at diminishing the accommodation effort while switching from far vision to near vision.

There exist products dedicated to specific age groups in this goal. Indeed, the accommodation effort is related to the maximum amplitude of accommodation. Younger adults with high amplitude of accommodation can more easily sustain a long near vision effort than emerging presbyopes.

However, even within an age group, the accommodation dynamics present disparities among individuals. For instance, there exists an individual variability in the amplitude of the accommodation response for people of the same age.

SUMMARY OF THE INVENTION

Therefore one object of the invention is to provide a method for determining an ophthalmic lens suitable for all individuals when they shift from far vision to near vision and vice versa.

The above object is achieved according to the invention by a method for determining an ophthalmic lens intended to be worn by an individual, said ophthalmic lens being adapted to provide to the individual a vision correction at at least one given vision gaze direction, said vision correction being based on wearer data including prescription data of the individual, wherein the method comprises the steps of:
  determining a parameter pertaining to the accommodative dynamics of an eye of the individual,
  determining said ophthalmic lens based on said wearer data and on the parameter pertaining to the accommodative dynamics of an eye of the individual.

Therefore, the method according to the invention allows personalizing an ophthalmic lens to an individual needs by taking into account his personal accommodation dynamics, thereby facilitating the change in optical power to gaze at objects located at different distances and improving the individual's comfort.

In an embodiment, when the parameter pertaining to the accommodative dynamics of the individual belongs to a predetermined range, the at least one given vision gaze direction comprises a first vision gaze direction corresponding to a primary vision gaze direction. In this case, the step of determining the ophthalmic lens further comprises defining the ophthalmic lens as having a complex surface with a substantially umbilic meridian and a mean-sphere progression greater than or equal to 0.25 diopter and less than 2.0 diopters, and the value of the mean-sphere progression is based on the parameter pertaining to the accommodative dynamics of an eye of the individual.

In an embodiment, the ophthalmic lens is a progressive lens, and the at least one given vision gaze direction further includes a second vision gaze direction different from the first vision gaze direction. In this case, the step of determining the progressive lens further comprises defining the power variation profile from far vision point to near vision point based on the parameter pertaining to the accommodative dynamics of an eye of the individual.

The parameter pertaining to the accommodative dynamics of an eye of the individual may comprise at least one of the following parameters:
  the speed of accommodation of the individual,
  the speed of disaccommodation of the individual,
  the latency of accommodation of the individual
  the latency of disaccommodation of the individual.

Advantageously, the step of determining the parameter pertaining to the accommodative dynamics of the individual is carried out by means of measurements during a visual task performed by the individual.

In an embodiment, the step of determining said ophthalmic lens comprises selecting an ophthalmic lens among a plurality of predetermined ophthalmic lenses based on the parameter pertaining to the accommodative dynamics of an eye of the individual.

Advantageously, the step of determining the ophthalmic lens is further based on the age of the individual.

The method according to the invention may comprise, before the step of determining the ophthalmic lens, a step of obtaining the maximum of accommodation amplitude of the individual, and the step of determining the ophthalmic lens is based on the maximum of accommodation amplitude of the individual.

This allows for further personalization of the ophthalmic lens.

Advantageously, the step of determining said the ophthalmic lens is further based on at least one of the following parameters: an individual's mobility profile, an individual ametropia, an individual's mobile device category.

Another object of the invention pertains to an optometry device for determining said parameter pertaining to the accommodative dynamics of an individual in the method according to the invention, wherein the optometry device comprises:
  a photorefraction unit, configured to carry out measurements of an objective refraction feature of the individual's eye,
  a display system configured to display alternately during a visual task a far vision target to the individual at a first distance and a near vision target to the individual at a second distance,
  a processing unit connected to the photorefraction unit and configured to:
    receive successively over time with a time reference several measurements from the photorefraction unit during the visual task,
    determine from these received measurements the parameter pertaining to the accommodative dynamics of the individual's eye.

Advantageously, the far vision target is displayed to the individual on a first sightline and said near vision target is displayed to the individual on a second sightline which is inclined downwards with respect to said first sightline.

In an embodiment, the display system comprises a near vision display and a far vision display, said near vision display and far vision display being distinct and positioned at different optical distances from the individual's eye.

For instance, the near vision display and/or the far vision display is a smartphone or a tablet screen.

Advantageously, the near vision display is mechanically linked to the photorefraction unit.

In an embodiment, the photorefraction unit comprises two distinct synchronized modules positioned respectively in the vicinity of the far vision target and of the near vision target.

DETAILED DESCRIPTION OF EXAMPLES

The following description, enriched with joint drawings that should be taken as non-limitative examples, will help understand the invention and figure out how it can be realized.

Figure 1:
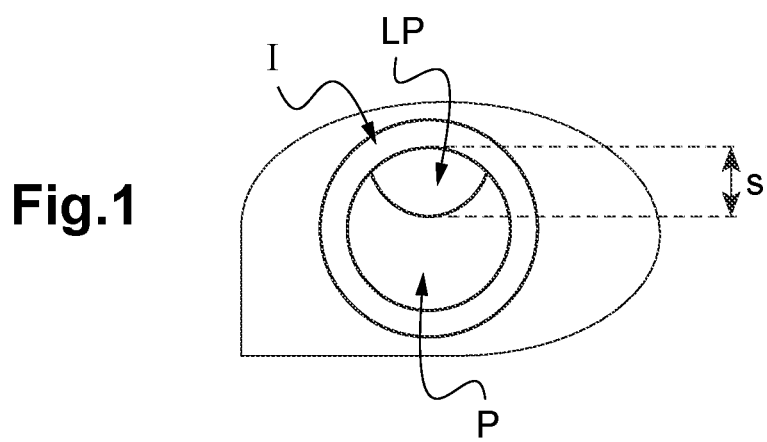
FIG. 1 is an illustration of a light pattern recorded by a photorefraction unit.

The invention proposes to consider the accommodation dynamics parameters of an individual in determining ophthalmic lenses to ease the accommodation effort while switching from far vision to near vision and reciprocally, for instance when using electronic devices such as laptops, smartphones or tablets.

Accommodation is the adjustment of the optics of the eye to keep an object in focus on the retina as the distance from the eye of this object varies. It is the process of adjusting the optical power of the optics of the eye. The term accommodation more specifically designates the adjustment from far onto a near object, while the term disaccommodation designates the relaxation of accommodation, that is, the change in optical power from near onto a far object.

By accommodation dynamics parameters, it is meant parameters such as the speed of accommodation of the individual, for instance evaluated in diopters per second, the speed of disaccommodation of the individual evaluated in diopters per second, the latency of accommodation of the individual, the latency of disaccommodation of the individual. The latency of accommodation is the time duration between the onset of a stimulus for accommodation and the moment at which an individual starts to perform the change in optical power required by the accommodation. The latency of disaccommodation is the time duration between the onset of a stimulus for disaccommodation and the moment at which an individual starts to perform the change in optical power required by the disaccommodation. Another accommodation dynamics parameter is the maximum of accommodation amplitude, for instance evaluated in diopters.

Such accommodation dynamics parameters can be measured with an optometry device according to the invention, which will be described below.

In an embodiment, the optometry device for determining parameters pertaining to the accommodation dynamics of an individual comprises a photorefraction unit, a display system and a processing unit.

The optometry device is designed to be used while the individual is performing visual tasks. The visual tasks engage the accommodation or disaccommodation of the individual.

The photorefraction unit can be held by the individual in his hands and is configured to carry out measurements of an objective refraction feature of the eye of the individual following the principle described below.

Light is sent from a light point source located in the photorefraction unit to the eye of the individual so as to illuminate the pupil of the individual. The light then enters into the eye of the individual, is partially reflected by the eye's retina and then crosses again the eye to reach a camera located in the photorefraction unit whose aperture is located in the same plane as the light point source.

The camera records a light pattern LP whose shape, size and orientation are at least linked to the eye refractive error of the individual. The light pattern LP might be further linked to the intrinsic parameters of the photorefraction device like the light source position in relation to the camera aperture, the size and shape of the camera aperture, the brightness of the light source and the camera exposure parameters, in addition to being linked to extrinsic parameters such as the measurement distance and the centering of the individual's eye in the field of view of the camera.

FIG. 1 is a schematic representation of such a light pattern LP. In this simplified drawing, the light pattern LP has a shape of part of a disk included in the pupil P and the iris I of the eye of the individual. The processing unit is configured to compute the eye refractive error of the individual based on the shape, size s and orientation of the recorded light pattern in real time. For instance, temporal evolutions of the eye refractive error of the individual can be recorded by the photorefraction unit during visual tasks. Therefore, accommodation properties can also be evaluated dynamically, while the individual performs different tasks requiring accommodation change.

The display system is used for the individual to perform the visual tasks aiming at assessing accommodation dynamics parameters of the individual. The display system comprises a far vision display, displaying a far vision target and a near vision display, displaying a near vision target. The far vision display displays the far vision target at about 5 to 6 meters from the individual. The near vision display displays the near vision target at about 30 cm to 40 cm from the individual. The display system is synchronized with the photorefraction device to ensure a good control of the measurements.

For instance, the far vision display may be a regular visual acuity chart and the far vision target may be a given line on the regular visual acuity chart. For instance, the near vision display may be a microdisplay complementing the photorefraction unit. Alternately, the near vision display may be a smartphone or a tablet. Advantageously, the near vision display and the photorefraction unit are on boarded on the same system. In an alternative, they are mechanically linked.

The near vision target consists for instance of various letters whose size and contrast may be adjusted according to the level of difficulty of the accommodation response to be assessed.

To simulate usual near vision and assess natural accommodation response dynamics, the far vision target is displayed in front of the subject, at eye level, and the near vision target is displayed about 30° below the primary viewing angle. The primary viewing angle sensibly corresponds to the horizontal axis. This represents an advantage above prior art optometry devices dedicated to the assessment of accommodation dynamics as this positioning of the near vision target allows taking measurements closer to natural posture or behavior, for instance, while looking at a smartphone.

Now a method for measuring accommodation dynamics parameters of an individual by means of the optometry device according to the invention will be described.

The principle is to observe in real time, for instance, at a frequency of at least 25 Hz, the light pattern recorded by the camera of the photorefraction unit, and to monitor the temporal evolution of the eye refractive error of the individual when he or she performs visual tasks engaging accommodation responses.

Therefore, the display system is configured to display alternately during a visual task the far vision target to the individual at a first distance and the near vision target to the individual at a second distance. The processing unit is connected to the photorefraction unit and configured to:
- receive successively over time with a time reference several measurements from the photorefraction unit during the visual task,
- determine from these received measurements the parameter pertaining to the accommodative dynamics of the individual's eye.

The parameter pertaining to the accommodative dynamics of the individual's eye may be computed in real time from the received measurements. In a variant, the measurements may be recorded in a dedicated memory.

In an embodiment, the method consists of measuring accommodation dynamics parameters of the individual, for instance his speed of accommodation or his latency of accommodation. The individual is instructed to fixate the far vision target and to gaze towards the near vision target as soon as he or she detects the effective display of the near vision target, for instance, a letter. Alternately, the individual is instructed to gaze towards the near vision target when a specific light signal is emitted by the near vision display, for instance light from LEDs.

The moment at which the effective display of the near target occurs is used as the temporal baseline for the assessment of the accommodation dynamics parameters. Departing from this temporal baseline, or preferably several seconds, for example, 0.5 second before this temporal baseline, measurements are taken with the photorefraction unit and processed by the processing unit. After this first task, the individual gazes back to the far vision target. The task is repeated at least twice. Preferably, five trials are performed. The accommodation dynamics parameter is assessed as the average of all of the results outcoming from the measurements during the different trials.

In another embodiment, the method consists of assessing both the accommodation dynamics and the disaccommodation dynamics, for instance, in addition to the speed of accommodation or the latency of accommodation of the individual, his speed of disaccommodation or his latency of disaccommodation. To assess the disaccommodation dynamics of the individual, the visual task consists of asking the individual to shift his gaze from the near vision target to the far vision target. More specifically, the individual is asked to maintain gaze fixation on the near vision target as long as, for instance, a letter is displayed. Then, as soon as the letter disappears, or at any other triggering signal, the individual has to gaze back to the far vision target. Preferably, three to five far-to-near and near-to-far gaze shifts are performed to obtain averaged values of the accommodation dynamics and disaccommodation dynamics parameters.

In another embodiment, the photorefraction unit comprises two assessment modules, one located in front of the individual so as to assess the change in far vision, and the other located about 30° downward and at 30 or 40 cm. Using two synchronized modules is interesting for several reasons. For instance, if positioned in the vicinity of the corresponding target—near vision target or far vision target, the corresponding module can take pictures with the eyes of the user facing the camera, which provides photorefraction acquisitions that are easier to interpret. Also, using two different modules allows for optimization of the position of their light sources, and more generally their opto-mechanical characteristics with respect to the different measurement distances.

In the previously described embodiments, the accommodation or disaccommodation responses are driven by a stimulus.

In another embodiment, the visual task consists of voluntary gaze shifts, resulting in voluntary accommodation or disaccommodation. An eyetracking system is used to follow the movements of the eye of the individual and thus determine when the individual shifts from the far vision target to the near vision target and vice versa. The eyetracking system is synchronized with the photorefraction unit and the display system.

In all those embodiments, the accommodation dynamics parameters can be assessed based on temporal evolutions of the eye refractive error of the individual obtained from the processing unit. More precisely, a mathematical model can be used to fit those temporal evolutions. One example of a mathematical model is an exponential model found in the paper "Amplitude dependent accommodative dynamics in humans", by Kasthurirangan and Vilupuru.

$$y(t)=y_0+a(1-e^{-t/T})$$

where $y_0$ denotes the eye refractive error of an individual at the onset of the stimulus for accommodation or disaccommodation, in diopters, $y(t)$ denotes the eye refractive error of the individual as a function of time during the accommodation or disaccommodation engaging visual task, and a and T are constants.

By fitting the segment of the measured temporal evolution of the eye refractive error corresponding to the far-to-near shift, or to the near-to-far shift, with such a model, the parameters pertaining to the accommodation dynamics of the individual can be determined with such measurements as time durations, slopes.

It should be noted that the different methods for determining accommodative dynamics parameters of an individual can be done with the naked eye or, in case the individual is ametropic, with correction ophthalmic lenses. If the individual is ametropic, the results with or without correction ophthalmic lenses will be different. For instance, if the individual is −1.00 diopter myopic and does not wear a correction ophthalmic lenses, his or her refractive error is −1.00 diopter. If an accommodative stimulus is provided at 40 cm, he or she will accommodate 1.5 diopters. However, if the same individual performs the accommodation while wearing an ophthalmic correction, that is, −1.00 diopter lenses, he or she will accommodate 2.5 diopters, as an emmetrope would do. Therefore, care must be taken, when implementing the different methods, whether the individual wears an ophthalmic corrective equipment or not.

Besides, it should be understood that the visual tasks are performed with both eyes of the individual open, but that the parameters pertaining to the accommodation dynamics of the eye are assessed for at least one eye. The values obtained can then be considered valid for both eyes.

In what follows, the method according to the invention for determining an ophthalmic lens intended to be worn by an individual, so as to ease the shifts between far vision and near vision, will be described. The ophthalmic lens will be determined to be adapted to provide to the individual a vision correction at at least one given vision gaze direction, said vision correction is based on the wearer data including prescription data of the individual. The prescription data comprise values of optical power and astigmatism at the distance visual point of the ophthalmic lens, as defined in the ISO 13666:2012 § 5.16 standard, and where appropriate, an addition value.

The method comprises the following steps:
  determining a parameter pertaining to the accommodative dynamics of an eye of the individual,
  determining the ophthalmic lens based on both the wearer data and on the parameter pertaining to the accommodation dynamics of the individual.

The parameter pertaining to the accommodation dynamics of the individual may be one of those previously defined.

For instance, determining the parameter pertaining to the accommodation dynamics of the individual is performed by measuring the parameter pertaining to the accommodation dynamics of the individual with the optometry device according to the invention.

In a first embodiment the parameter pertaining to the accommodation dynamics of an eye of the individual is the speed of accommodation of the eye.

In a first example of this first embodiment, the ophthalmic lens is determined by tailoring a customized ophthalmic lens based on the speed of accommodation of the eye. The customized ophthalmic lens is designed with an additional optical power at a given reference point in its lower half to ease near vision. The rationale used in this first example is to link the amount of additional optical power boost, expressed in diopters, to the speed of accommodation of the individual. Preferably, when the speed of accommodation increases, the additional optical power boost decreases.

Figure 2A:
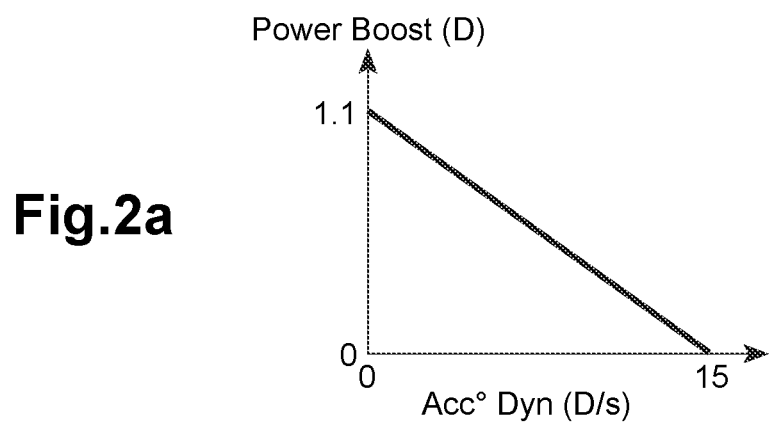
FIGS. 2a and 2b illustrate the principles of two variants of a first example according to a first embodiment of the method for determining an ophthalmic lens according to the invention.

Here, it is considered that a speed of accommodation of 15 diopters per second is normal, or in other words, optimal. Therefore, a null additional optical power is associated with this value of speed of accommodation. At the opposite, that is to say a null speed of accommodation, an additional optical power of at least 1.1 diopters is associated. In this first example, an affine function linking those two extreme points is used for attributing an additional optical power to a given speed of accommodation value. FIG. 2a illustrates such an affine function.

Figure 2B:
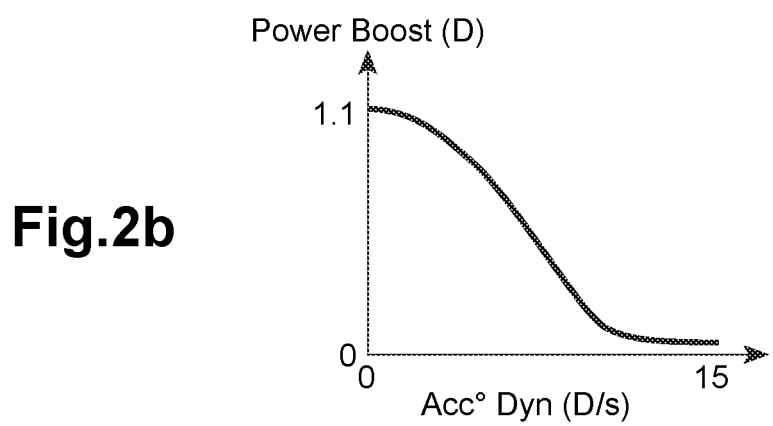

In a variant, a psychometric function, determined by psychometric measurements, may be used for attributing an additional optical power to a given speed of accommodation. FIG. 2b illustrates such a psychometric function. The psychometric function can be a sigmoid function or inverted logistic S-curve.

In a second example of this first embodiment, a correspondence is carried out between a given range of speeds of accommodation and an ophthalmic lens Ld designed to decrease the fatigue of a user when performing near vision activities.

Such a designed ophthalmic lens Ld may have a complex rear surface such as the lenses described in the U.S. Pat. No. 7,540,610 B2. The complex rear surface of those lenses has a substantially umbilic meridian and a mean-sphere progression, referred to as a boost value, greater than or equal to 0.25 diopter and less than 1.10 diopters. The meridian of the complex surface is a line formed by the intersection points with the complex surface of mean gaze directions of a wearer when he is looking from far to near visions. The mean-sphere progression is defined as the difference between the two reference points (the centering point and the given reference point).

According to this design, the following lenses may be taken into account:
  Lens 1: this lens presents an additional optical power boost value of 1.1 diopters;
  Lens 2: this lens presents an additional optical power boost value of 0.85 diopter;
  Lens 3: this lens presents an additional optical power boost value of 0.60 diopter;
  Lens 4; this lens presents an additional optical power boost of 0.40 diopter.

Alternatively, the designed ophthalmic lens Ld may be of the type Lens 5 described in the European patent application EP 3547013 A1. More precisely, this type of ophthalmic lenses is a single vision ophthalmic lens having at least a prescribed optical power, providing to the wearer in standard wearing condition in at least a first gazing direction the prescribed optical power when gazing at a first distance and in at least a second gazing direction the prescribed optical power when gazing at a second distance, the first and second distance being different and the first and second gazing direction being different.

Lens 5 is a single vision lens that presents a shape optimized when gazing in the second gazing direction, so as to introduce low optical aberrations.

The previously mentioned correspondence between a range of speeds of accommodation and an ophthalmic lens Ld may be carried out as follows.

If the individual has a speed of accommodation equal to or below 2.49 diopters per second, the boost value is determined as 1.1 diopters. For instance, Lens 1 may be chosen. If the individual has a speed of accommodation comprised between 2.50 and 4.99 diopters per second, the boost value is determined as 0.85 diopter. For instance, Lens 2 may be chosen. If the individual has a speed of accommodation comprised between 5.00 and 7.49 diopters per second, the boost value is determined as 0.60 diopter. For instance, Lens 3 may be chosen. If the individual has a speed of accommodation comprised between 7.50 and 9.99 diopters per second, the boost value is determined as 0.40 diopter. For instance, Lens 4 may be chosen. If the individual has a speed of accommodation equal to or greater than 10 diopters per second, the ophthalmic lens could be determined as a traditional single vision lens, preferably an optimized single vision lens and may be chosen as Lens 5. The numerical values of speed of accommodation delimiting the different ranges of speeds of accommodation above are given as non-limiting examples and other values could be chosen.

In a third example of the first embodiment, an existing lens may be selected with correspondence to different ranges of speeds of accommodation.

In a second embodiment, the parameter pertaining to the accommodation dynamics of an eye of the individual is the maximum of accommodation of the eye.

In a first example of this second embodiment, the ophthalmic lens is determined by tailoring a customized ophthalmic lens based on the maximum of accommodation of the eye. In this first example, the customized ophthalmic lens is a progressive addition lens with a tailored progression profile. The progression profile of a progressive addition lens is a curve representing the power progression along a lens meridian extending between the far vision zone and the near vision zone, with in-between an intermediate vision zone. This first example finds an application in cases where an older individual frequently switches between one lens area and another area, for instance between the far vision zone and the intermediate vision zone, or for instance between the intermediate vision zone and the near vision zone, or between the far vision zone and the near vision zone.

Figure 3:
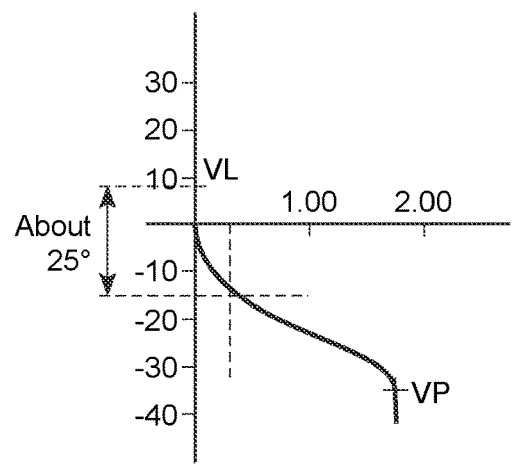
FIG. 3 illustrate a standard progression profile of a progressive addition lens.

FIG. 3 illustrates a standard progression profile of a progressive addition lens of an older individual needing a 1.75 diopters addition for near vision activities. It is assumed that this individual has a maximum of accommodation of 1.75 diopters.

Figure 4:
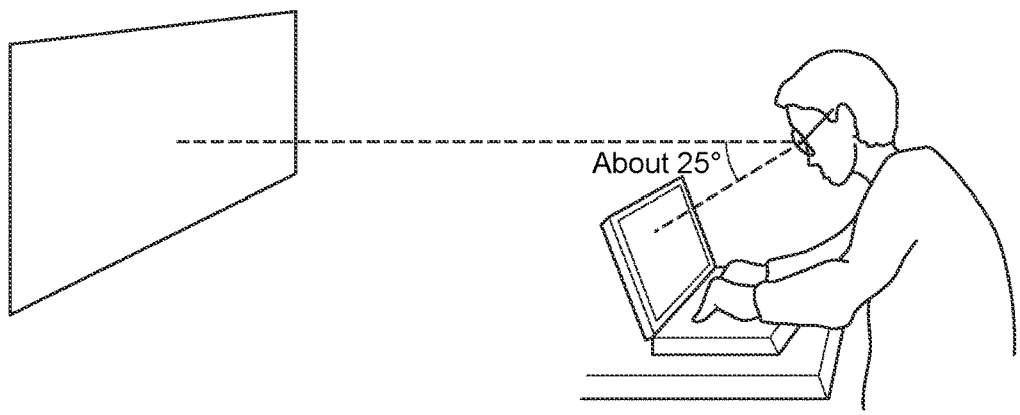
FIG. 4 is an illustration of an example of a far-to-near and near-to-far vision shifts task.

As represented on FIG. 4, this individual makes frequent saccades between the screen of his laptop located at about 80 cm, and a board located at 5 m. According to the progression profile, this individual has only 0.25 diopters of accommodation left to switch from the screen of his laptop to the board and vice versa. Hence, to perform this dual task of switching back and forth between the two viewpoints, an accommodation response or disaccommodation response of 1 diopter is needed, which is more than half of the maximum of accommodation of this individual.

If, in addition, this individual presents a long latency of accommodation, the dual task will be uncomfortable, resource demanding and will require a lot of time in focus management.

Figure 5A:
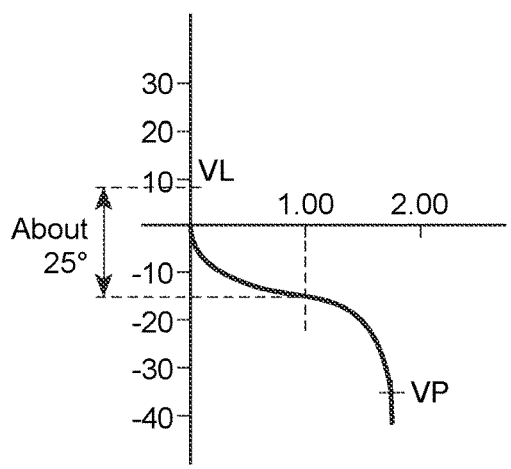
FIGS. 5a and 5b are progression profiles of two ophthalmic lenses determined in a first example of a second embodiment of the method according to the invention.

FIG. 5a illustrates a first tailored progression profile tailored for this individual. This first tailored progression profile presents a faster portion from the far vision reference point VL to the intermediate reference point VI, so that the change in focus to perform the shift between the screen of the laptop and the board can be made faster.

Figure 5B:
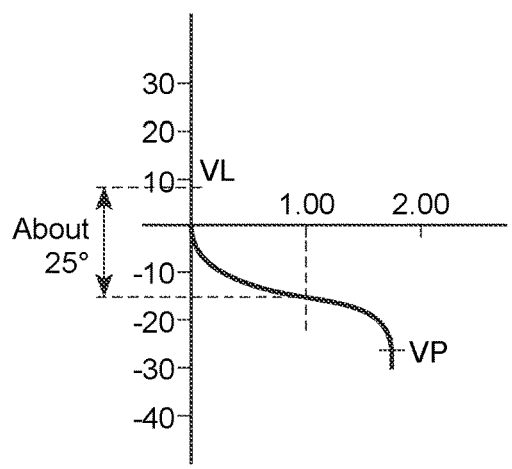

FIG. 5b illustrates a second tailored progression profile tailored for this individual. This second tailored progression profile is shorter than the progression profile of FIG. 3. This means that the near vision distance is assumed, in this design, farther than in the case of the progression profile of FIG. 3. As a consequence, the addition power corresponding to the viewing distance of the screen of the laptop is stronger and the change in focus to perform the shift between the screen of the laptop and the board requires less accommodation or disaccommodation.

Figure 6:
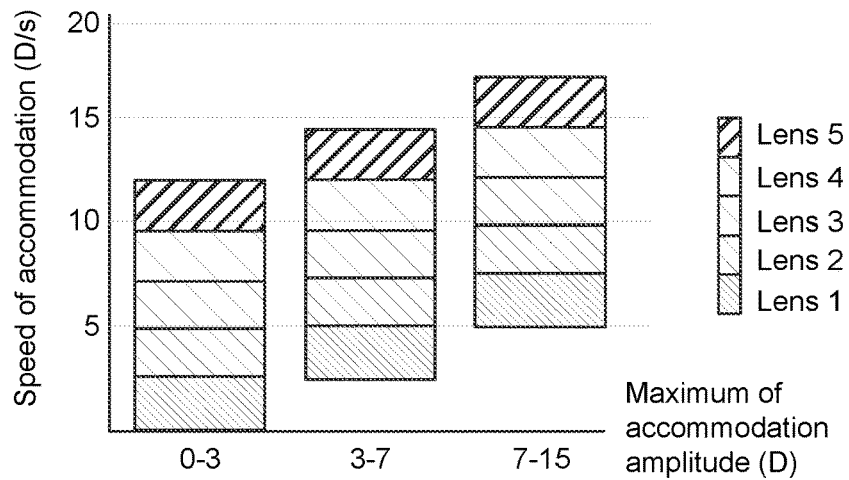
FIG. 6 illustrates the principle of a second example according to the second embodiment of the method for determining an ophthalmic lens according to the invention.

In a second example of the second embodiment, illustrated on FIG. 6, the range of maximum of accommodation, evaluated in diopters, is segmented into three sub-ranges A, B and C, respectively corresponding to: 0 to 3 diopters, 3 to 7 diopters and 7 to 15 diopters.

For each of the sub-ranges A, B and C, the range of speeds of accommodation is also split into five sub-ranges of width 2.5 diopters per second.

If the individual has a maximum of accommodation comprised in sub-range A, the ophthalmic lens may be chosen as respectively Lens 1, Lens 2, Lens 3, Lens 4 and Lens 5, for respectively sub-ranges of speeds of accommodation comprised between 0 and 2.49 diopters per second, 2.50 and 4.99 diopters per second, 5.00 and 7.49 diopters per second, 7.50 and 9.99 diopters per second and 10.00 and 12.50 diopters per second.

If the individual has a maximum of accommodation comprised in sub-range B, the ophthalmic lens may be chosen as respectively Lens 1, Lens 2, Lens 3, Lens 4 and Lens 5, for respectively sub-ranges of speed of accommodation comprised between 2.5 and 4.99 diopters per second, 5.00 and 7.49 diopters per second, 7.50 and 9.99 diopters per second, 10.00 and 12.49 diopters per second and 12.50 and 15.00 diopters per second.

If the individual has a maximum of accommodation comprised in sub-range C, the ophthalmic lens may be chosen as respectively Lens 1, Lens 2, Lens 3, Lens 4 and Lens 5, for respectively sub-ranges of speeds of accommodation comprised between 5 and 7.49 diopters per second, 7.50 and 9.99 diopters per second, 10.00 and 12.49 diopters per second, 12.50 and 14.99 diopters per second and 15.00 and 17.50 diopters per second.

This way of determining the ophthalmic lens uses the fact that individuals presenting a low maximum of accommodation and a slow speed of accommodation need more help (by means of a power boost) in their accommodation. On the contrary, individuals presenting a high maximum of accommodation and a fast speed of accommodation would be less demanding in terms of accommodation help through a power boost.

The numerical values of speed of accommodation and maximum of accommodation delimiting the respective sub-ranges above are given as non-limiting examples and other values could be chosen.

Figure 7:
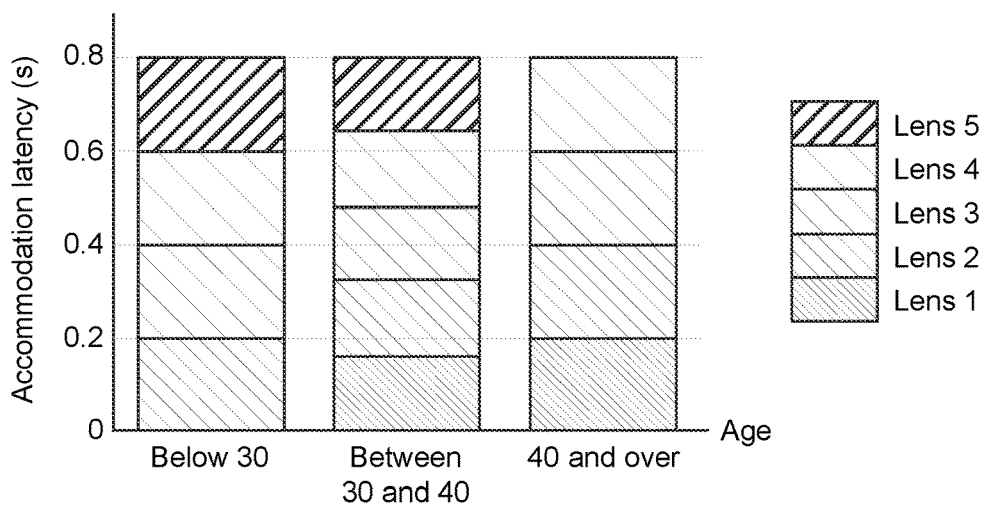
FIG. 7 illustrates the principle of a third embodiment of the method for determining an ophthalmic lens according to the invention.

In a third embodiment, illustrated on FIG. 7, the parameter pertaining to the accommodation dynamics of an eye of the individual is the latency of accommodation of the individual. The age range is split into several age groups. A correspondence between sub-ranges of values of latency of accommodation, age groups and ophthalmic lenses designed for reducing fatigue of individuals when they perform near vision activities may be carried out as follows.

If the individual is aged below 30 years old, the ophthalmic lens may be respectively chosen as Lens 5, Lens 4, Lens 3, Lens 2 if the individual has a latency of accommodation respectively longer than 0.60 second, comprised between 0.40 and 0.59 second, comprised between 0.20 and 0.39 second, and shorter than 0.19 second.

If the individual is between 30 and 40 years old, the selected ophthalmic lens may be respectively chosen as Lens 5, Lens 4, Lens 3, Lens 2 and Lens 1 if the individual has a latency of accommodation respectively longer than 0.64 second, comprised between 0.48 and 0.63 second, comprised between 0.32 and 0.47 second, comprised between 0.16 and 0.31 second and shorter than 0.15 second.

If the individual is over 40 years old, the selected ophthalmic lens may be respectively chosen as Lens 4, Lens 3, Lens 2 and Lens 1 if the individual has a latency of accommodation respectively longer than 0.60 second, comprised between 0.40 and 0.59 second, comprised between 0.20 and 0.39 second and shorter than 0.19 second.

It can be observed that the high boost Lens 1 is not taken into account for younger individuals, while the single vision Lens 5 is not taken into account for older individuals.

Indeed, the accommodation capabilities of older individuals are more limited, therefore proposing a single vision lens with no boost value appears less interesting. On the contrary, the accommodation capabilities of young individuals are rarely limited, therefore proposing lenses with high boost appears less interesting and the optical aberrations introduced by the boost would induce peripheral swimming effects and a higher subjective discomfort than the potential accommodation change benefit.

Other variants of the embodiments and examples previously described may be envisaged.

Figure 8:
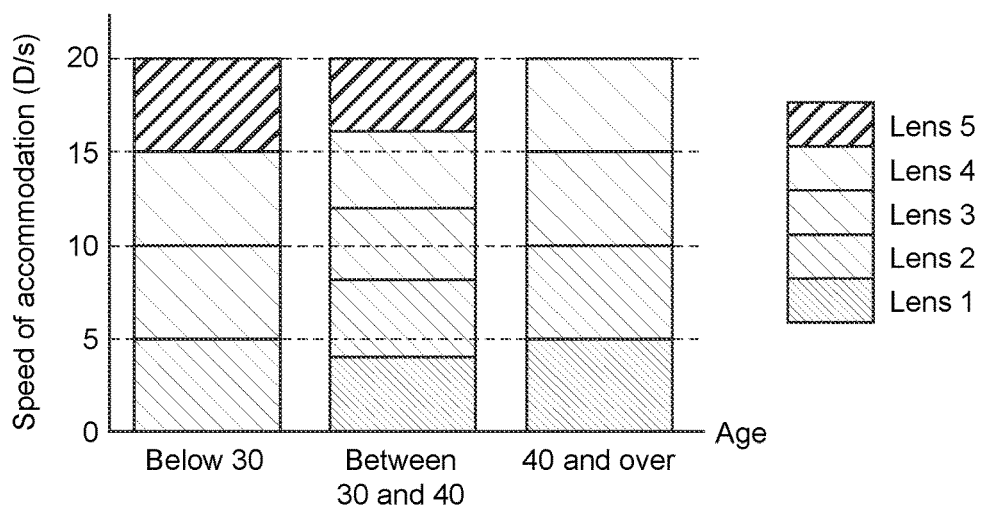
FIG. 8 illustrates the principle of a variant of the method for determining an ophthalmic lens according to the invention.

For instance, the ophthalmic lens may be determined based on the speed of accommodation and on the age of the individual. The age range is split into several age groups. The rationale is that, for each age group, when speed increases, boost value decreases. FIG. 8 illustrates how a correspondence between age groups, sub-ranges of speeds of accommodation and ophthalmic lenses designed for reducing fatigue of individuals when they perform near vision activities may be carried out.

If the individual is aged below 30 years old, the ophthalmic lens may be respectively chosen as Lens 5, Lens 4, Lens 3, Lens 2 if the individual has a speed of accommodation respectively faster than 15 diopters per second, comprised between 10 and 14.99 diopters per second, comprised between 5 and 9.99 diopters per second, and slower than 4.99 diopters per second.

If the individual is aged between 30 and 40 years old, the selected ophthalmic lens may be respectively chosen as Lens 5, Lens 4, Lens 3, Lens 2 and Lens 1 if the individual has a speed of accommodation respectively faster than 16 diopters per second, comprised between 12 and 15.99 diopters per second, comprised between 8 and 11.99 diopters per second, comprised between 4 and 7.99 diopters per second and slower than 3.99 diopters per second.

If the individual is aged over 40 years old, the selected ophthalmic lens may be respectively chosen as Lens 4, Lens 3, Lens 2 and Lens 1 if the individual has a speed of accommodation respectively faster than 15 diopters per second, comprised between 10 and 14.99 diopters per second, comprised between 5 and 9.99 diopters per second and slower than 4.99 diopters per second.

It can be observed in this variant that the high boost Lens 1 is not taken into account for younger individuals, while the single vision Lens 5 is not taken into account for older individuals.

Indeed, the accommodation capabilities of older individuals are more limited, therefore proposing a single vision lens with no boost value appears less interesting. On the contrary, the accommodation capabilities of young individuals are rarely limited, therefore proposing lenses with high boost appears less interesting and the optical aberrations introduced by the boost would induce peripheral swimming effects and a higher subjective discomfort than the potential accommodation change benefit.

Like in the preceding examples, the numerical values of speed of accommodation delimiting the sub-ranges above are given as non-limiting examples and other values could be chosen.

The invention claimed is:

1. A method for determining an ophthalmic lens intended to be worn by an individual, said ophthalmic lens being adapted to provide to the individual a vision correction at, at least one, given vision gaze direction, said vision correction being based on wearer data including prescription data of the individual, the method comprising:
   determining a parameter pertaining to accommodative dynamics of an eye of the individual; and
   determining said ophthalmic lens based on said wearer data and on the parameter pertaining to the accommodative dynamics of the eye of the individual, wherein
   the parameter pertaining to the accommodative dynamics of the eye of the individual comprises at least one of the following parameters:
      a speed of disaccommodation of the individual,
      a latency of accommodation of the individual, and
      a latency of disaccommodation of the individual.

2. The method according to claim 1, wherein:
   when the parameter pertaining to the accommodative dynamics of the individual belongs to a predetermined range, the at least one given vision gaze direction comprises a first vision gaze direction corresponding to a primary vision gaze direction,
   the determining of said ophthalmic lens further comprises defining the ophthalmic lens as having a complex surface with a substantially umbilic meridian and a mean-sphere progression greater than or equal to 0.25 diopter and less than 1.10 diopters, and
   a value of the mean-sphere progression is based on the parameter pertaining to the accommodative dynamics of the eye of the individual.

3. The method according to claim 2, wherein the ophthalmic lens is a progressive lens,
   the at least one given vision gaze direction further includes a second vision gaze direction different from the first vision gaze direction, and
   the determining of said progressive lens further comprises defining a power variation profile from far vision point to near vision point based on the parameter pertaining to the accommodative dynamics of the eye of the individual.

4. The method according to claim 1, wherein the parameter pertaining to the accommodative dynamics of the eye of the individual further comprises the following parameter:
   a speed of accommodation of the individual.

5. The method according to claim 1, wherein the determining of the parameter pertaining to the accommodative dynamics of the eye of the individual is carried out by means of measurements during a visual task performed by the individual.

6. The method according to claim 1, wherein the determining of said ophthalmic lens comprises selecting an ophthalmic lens among a plurality of predetermined ophthalmic lenses based on the parameter pertaining to the accommodative dynamics of the eye of the individual.

7. The method according to claim 1, wherein the determining of the ophthalmic lens is further based on an age of the individual.

8. The method according to claim 1, further comprising, before the determining of said ophthalmic lens, obtaining a maximum of accommodation amplitude of the individual,
   wherein the determining of said ophthalmic lens is based on the maximum of accommodation amplitude of the individual.

9. The method according to claim 1, wherein the determining of said ophthalmic lens is further based on at least one of the following parameters: an individual's mobility profile, an individual ametropia, an individual's mobile device category.

10. An optometry device for determining a parameter pertaining to accommodative dynamics of an eye of an individual, said optometry device comprising:

a photorefraction unit configured to carry out measurements of an objective refraction feature of the individual's eye;

a display system configured to display alternately during a visual task a far vision target to the individual at a first distance and a near vision target to the individual at a second distance; and processing circuitry connected to the photorefraction unit and configured to:

receive successively over time with a time reference several measurements from said photorefraction unit during said visual task, and determine from the received measurements said parameter pertaining to the accommodative dynamics of the individual's eye, wherein the parameter pertaining to the accommodative dynamics of the individual's eye comprises at least one of the following parameters:

a speed of disaccommodation of the individual,
a latency of accommodation of the individual, and
a latency of disaccommodation of the individual.

11. The optometry device according to claim 10, wherein said far vision target is displayed to the individual on a first sightline and said near vision target is displayed to the individual on a second sightline which is inclined downwards with respect to said first sightline.

12. The optometry device according to claim 10, wherein the display system comprises a near vision display and a far vision target display, said near vision display and far vision display being distinct and positioned at different optical distances from the individual's eye.

13. The optometry device according to claim 12, wherein the near vision display and/or the far vision display is a smartphone or a tablet screen.

14. The optometry device according to claim 12, wherein the near vision display is mechanically linked to the photorefraction unit.

15. The optometry device according to claim 10, wherein the photorefraction unit comprises two synchronized modules positioned respectively in a vicinity of the far vision target and of the near vision target.

* * * * *